Patented Aug. 10, 1948

2,446,619

UNITED STATES PATENT OFFICE 2,446,619

POLYMERIZATION OF OLEFINS IN THE PRESENCE OF HYDROGEN

Meredith M. Stewart and Frank J. Moore, Beacon, N. Y., assignors to The Texas Company, New York, N. Y., a corporation of Delaware No Drawing. Application August 21, 1945, Serial No. 611,912

5 Claims. (Cl. 260—683.15)

This invention relates to the polymerization of olefins by contact with a catalyst.

The invention has to do with the catalytic polymerization of normally gaseous olefins, and in particular ethylene and propylene, in the presence of a non-reactive gas such as hydrogen under conditions effective to produce hydrocarbons valuable for gasoline manufacture. The invention is particularly concerned with the conversion of these light gaseous olefins into their corresponding dimers.

In the conventional polymerizing operations, these light olefins are converted mainly to trimer and higher molecular weight polymers. In accordance with the present invention, these olefins are converted mainly to the dimer form without hydrogenation occurring, at least to any substantial extent. In other words, in the resulting polymer product the dimer predominates.

Catalysts useful in the invention are of the solid adsorptive type such as phosphoric acid supported on clay, fuller's earth, alumina or kieselguhr, etc.; alumina-boria, alumina-silica, acid treated alumina, etc. Another type of effective catalyst consists of an acidic component such as phosphoric acid, boric acid, silicic acid, or an anhydride thereof active for polymerization, and an oxide or sulfide of one of the variable valent metals active for the hydrogenation and dehydrogenation of hydrocarbons. The acidic component or anhydride thereof and the oxide or sulfide are advantageously supported on a base of silica, alumina, silica alumina, or clay, etc. Examples of variable valent metals contemplated are tungsten, vanadium, molybdenum and chromium.

In accordance with the invention, the catalyst may be disposed in the form of a substantially stationary mass of solid adsorptive particles confined within a reaction zone and maintained at a temperature in the range about 200 to 900° F. and preferably in the range about 450 to 650. The polymerization reaction may be carried out under a pressure ranging from substantially atmospheric to about 400 pounds per square inch gauge.

It is contemplated that instead of disposing the catalyst in a fixed bed within the reaction zone it may be used either in the form of a mass moving through the reaction zone or may be used as a suspension of powder within the reaction gases or vapors. The catalyst may thus be maintained in a fluidized condition within the reaction zone.

In operation, a stream of feed olefin in gas phase and heated to the desired temperature is passed through the reaction zone in contact with the solid catalyst under conditions such that polymerization of olefins occurs at least to a substantial extent. Hydrogen or other non-hydrocarbon gas, similarly inert and characterized by having a low adsorptive coefficient for the polymerization catalyst, is added to the hydrocarbon feed stream prior to contact with the catalyst. The amount of gas so added to the feed stream may range from about 250 to 800 or more cubic feet per barrel of liquefied feed hydrocarbon.

Advantageously the hydrogen amounts to not less than about 20% by volume and may range from 20 to 100% by volume of the feed olefin vapor flowing into the reaction zone, the volume being computed at the temperature and pressure prevailing in the reaction zone.

Contact between the olefins and the solid catalyst is thus effected in the presence of a substantial amount of added gas. The products of reaction, including the added gas, are removed from the reaction zone and subjected to the usual fractionating procedure for the purpose of effecting separation between gaseous constituents and liquid hydrocarbons, the liquid hydrocarbons being separated into fractions as desired. The gaseous constituents may be recycled all or in part to the polymerization reaction, although in the usual case provision is made for eliminating at least a portion of the hydrocarbon gases from the system in order to avoid the building up of these gases in the system. It is thus contemplated that the gaseous fractions separated from the products of reaction may be fractionated so as to separate therefrom a recycled gas consisting essentially of hydrogen or other gas initially added to the feed.

It has been found that by effecting the polymerization of propylene in the presence of a substantial amount of added hydrogen the dimer content of the resulting polymer product is materially greater than what it is when the polymerization is effected in the absence of added hydrogen (or even in the presence of a small amount of hydrogen). The hydrogen gas apparently does not enter into the polymerization reaction since the polymer product obtained is characterized by having as high a bromine number or an even higher bromine number than that of a comparable product obtained in the absence of added hydrogen. In the following examples propylene was polymerized by contact with a $SiO_2$-$MoO_3$-$H_3PO_4$ catalyst at a temperature of about 550 to 600° F. and under a pressure of 200 pounds per square inch gauge. The hydrocarbon feed consisted of a mixture of propane and propylene containing about 45 mol. per cent of propylene.

The catalyst used in these experiments was prepared by slurrying wet silica gel upon which molybdenum oxide was deposited with dilute phosphoric acid followed by filtration and washing with a very dilute phosphoric acid solution. The product so prepared was dried to 20% water content and pelleted. The catalyst so prepared contained about 0.25 weight per cent molybdena and about 2.0% $H_3PO_4$.

In run A no hydrogen was added to the hydrocarbon feed, while in run B hydrogen was fed to the reaction zone at the rate of about 300 to 400 cubic feet per barrel of feed hydrocarbon measured as liquid at about room temperature. The feed hydrocarbon rate of charging in both experiments was about 1.8 to 2.0 pounds per pound of catalyst per hour. The results obtained were as follows:

| Run No. | A | B |
| --- | --- | --- |
| Hyd. feed............cubic feet per barrel.. | None | Approx. 350 |
| Liquid product, wt. per cent basis olefin feed. | 12 | 25.7 |
| Liquid product composition, volume per cent: | | |
| $C_4$ fraction | 6.3 | 4.5 |
| $C_6$ fraction | 17.7 | 55.6 |
| Bromine No | 182 | 196 |
| $C_7$ fraction | 5.2 | 6.7 |
| Bromine No | 168 | 182 |
| $C_8$ fraction | 9.1 | 6.7 |
| Bromine No | 141 | 152 |
| $C_9$ fraction | 36.2 | 17.7 |
| Bromine No | 128 | 135 |
| Residue | 26.0 | 10.8 |
| Bromine No | 109 | 113 |

As indicated by the foregoing comparison, the addition of hydrogen to the reaction more than doubled the yield of liquid product obtained. Moreover, the product obtained by effecting the polymerization in the presence of the added hydrogen contained 55.6% of the dimer or $C_6$ fraction as compared with only 17.7% when effecting the polymerization under similar conditions but in the absence of added hydrogen.

Also, it will be observed that the bromine numbers of the $C_6$ and higher fractions are somewhat higher when effecting the polymerization in the presence of added hydrogen indicating that even though a large amount of hydrogen was present in the reaction, hydrogenation of the olefinic or polymer material did not occur to any substantial extent.

Similar experiments were made with the same type of olefin feed under substantially similar operating conditions as in the foregoing experiments but using a $B_2O_3$-$MoO_3$-$Al_2O_3$ catalyst. In the absence of added hydrogen less than 4% of the propylene was converted to liquid products, while in the presence of added hydrogen more than 30 weight per cent of the propylene was converted to liquid products, the product in the latter case containing a substantial proportion of the dimer.

The improved results thus obtained by adding hydrogen to the hydrocarbon feed are apparently not due solely to the increased velocity effect as a result of the added hydrogen gas since the same improvement does not materialize by simply increasing the proportion of propane while retaining the same rate of olefin feed through the catalyst mass. In other words, substituting propane for hydrogen does not result in an increased yield of dimer. On the contrary, it was found that increasing the proportion of propane in the $C_3$ feed stock actually resulted in a decrease in the proportion of dimer in the polymer product. Increasing the mol per cent of propane in the $C_3$ feed mixture from 10 to about 77% decreased the polymer yield basis propylene by more than 75%.

Hydrogen has a relatively low adsorptive coefficient for solid adsorptive catalysts such as alumina-silica, alumina-boria, and phosphoric acid supported catalysts, and this coefficient is substantially less than that for hydrocarbon gases such as propane. This may account for the apparent superiority of hydrogen over a light hydrocarbon such as propane. It is thus contemplated employing an added gas having an adsorptive coefficient substantially less than that of gaseous hydrocarbons.

While hydrogen has been specifically mentioned, it is contemplated that other oxygen-free monatomic or diatomic gaseous agents which are non-reactive and characterized by an adsorptive coefficient lower than methane may be used. For example, nitrogen may be used instead of hydrogen. It has been found that by effecting the polymerization of propylene in the presence of added nitrogen with a boria-molybdena-alumina catalyst the dimer content of the resulting polymer product is greatly increased and comparable to that obtained when using hydrogen, although the yield of polymer product may not be as great as that obtained with hydrogen.

Obviously many modifications and variations of the invention as above set forth may be made without departing from the spirit and scope thereof, and therefore only such limitations should be imposed as are indicated in the appended claims.

We claim:

1. In the catalytic polymerization of $C_2$ and $C_3$ olefins, the method comprising passing said olefins in contact, in a reaction zone, with a catalyst comprising $SiO_2$, about 0.25% $MoO_3$ and about 2.0% $H_3PO_4$ by weight, and effecting said contact under polymerizing conditions in the presence of added hydrogen amounting to from about 20% to 100% by volume of feed olefin vapor flowing into said reaction zone at a temperature within the range of about 450–650° F. and under a pressure of about 200 pounds per square inch, thereby producing a polymer product consisting mainly of dimer.

2. In the catalytic polymerization of $C_2$ and $C_3$ olefins by contact in vapor phase with a solid adsorptive polymerization catalyst in a reaction zone under elevated pressure at a temperature in the range of about 450 to 650° F. and normally conducive to production of a liquid polymer product consisting mainly of trimer and higher molecular weight polymers, the method of increasing the dimer constituent to a major component of the liquid polymer product which consists in effecting said contact with a catalyst containing an oxide of a group VI metal and in the presence of added hydrogen amounting to from 20 to about 100% by volume of the feed olefin vapor flowing into said reaction zone, the proportion of said group VI metal oxide contained in said catalyst being restricted to a small amount such that polymerization is effected in the substantial absence of hydrogenation, the yield of total liquid polymer being substantially greater than that obtained in the absence of added hydrogen and consisting predominantly of dimer.

3. The method according to claim 2 in which the catalyst comprises an acid formed by the hydration of an oxide of an element selected from the group of elements consisting of phosphorous, boron and silicon, a small amount of an oxide of a group VI metal, and a solid adsorptive supporting material.

4. The method according to claim 2 in which the catalyst comprises $SiO_2$, $MoO_3$ and $H_3PO_4$.

5. The method according to claim 2 in which the catalyst comprises $B_2O_3$, $MoO_3$ and $Al_2O_3$.

MEREDITH M. STEWART.
FRANK J. MOORE.

REFERENCES CITED

The following references are of record in the file of this patent:

UNITED STATES PATENTS

| Number | Name | Date |
|---|---|---|
| 2,227,639 | Frey et al. | Jan. 7, 1941 |

FOREIGN PATENTS

| Number | Country | Date |
|---|---|---|
| 340,513 | Great Britain | Dec. 22, 1930 |